United States Patent [19]
Ducan

[11] Patent Number: 5,419,514
[45] Date of Patent: May 30, 1995

[54] VTOL AIRCRAFT CONTROL METHOD

[76] Inventor: Terry A. Ducan, 13311 Old Oaks, Fenton, Mich. 48430

[21] Appl. No.: 152,027

[22] Filed: Nov. 15, 1993

[51] Int. Cl.$^6$ .................. B64C 15/12; B64C 29/00
[52] U.S. Cl. .................. 244/12.4; 244/23 B; 244/56
[58] Field of Search .......... 244/12.5, 12.4, 12.5, 244/23 D, 23 D, 56

[56] References Cited

U.S. PATENT DOCUMENTS

| D. 171,509 | 2/1954 | Lightbourn | 244/23 C |
|---|---|---|---|
| 2,082,674 | 6/1937 | Young | 244/82 |
| 2,926,868 | 3/1960 | Taylor | 244/56 |
| 2,939,654 | 6/1960 | Coanda | 244/23 C |
| 2,961,189 | 11/1960 | Doak | 244/12.4 |
| 3,037,721 | 6/1962 | Stefanutti | 244/7 |
| 3,089,660 | 5/1963 | Bilane | 242/56 |
| 3,181,810 | 5/1965 | Olson | 244/7 |
| 3,231,221 | 1/1966 | Platt | 244/12 |
| 3,335,977 | 8/1967 | Meditz | 244/12 |
| 3,514,053 | 5/1970 | McGuinness | 244/23 C |
| 3,917,195 | 11/1975 | Oguri | 244/66 |
| 4,492,353 | 1/1985 | Phillips | 244/56 |
| 4,856,732 | 8/1989 | Eickmann | 244/2 |
| 4,979,698 | 12/1990 | Lederman | 244/8 |
| 5,054,716 | 10/1991 | Wilson | 244/56 |
| 5,141,176 | 8/1992 | Kress et al. | 244/48 |

FOREIGN PATENT DOCUMENTS

| 2050260 | 1/1931 | United Kingdom | 244/23 D |
|---|---|---|---|
| 1195387 | 6/1970 | United Kingdom | 244/12.4 |

Primary Examiner—Andres Kashnikow
Assistant Examiner—Virna Lissi Mojica
Attorney, Agent, or Firm—Young, MacFarlane & Wood

[57] ABSTRACT

In a vertical take-off and landing vehicle, the invention is a method for improving stability by virtue of establishing conversion of thrust vectors over the center of gravity of the vehicle while in the hover position. Through the use of selected angles of inclination of the thrust-generating devices, a positive static stability of the aircraft is maintained. In addition, the spars supporting the thrust-generating devices are mounted in a fixed angular relationship to the centerline of the aircraft's fuselage, to achieve the desired inclination of the thrust vectors of the lift-generating devices toward the centerline of the vehicle, by simple rotation of the spars on which the lift-generating devices are mounted.

2 Claims, 5 Drawing Sheets

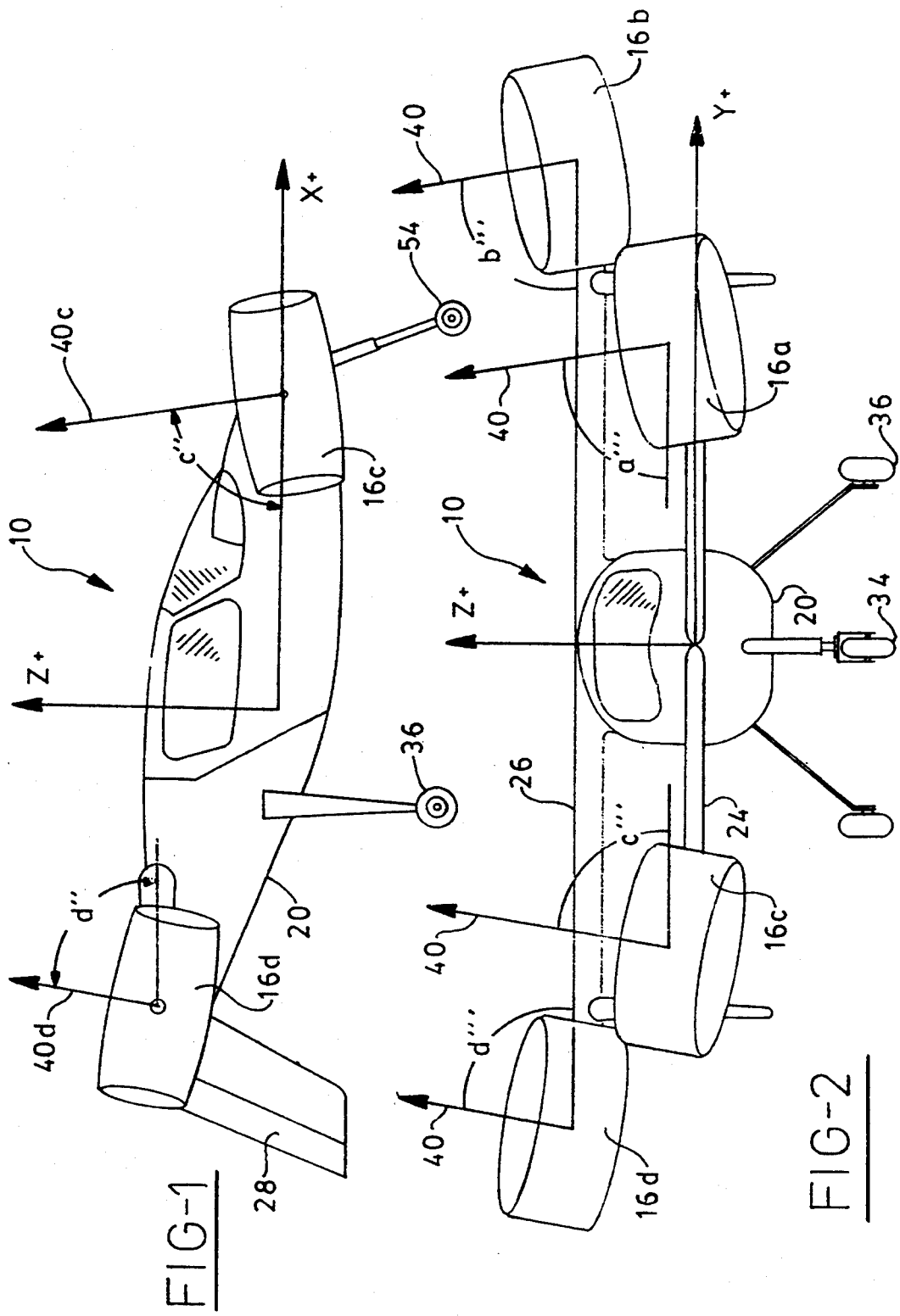

VTOL AIRCRAFT CONTROL METHOD

FIELD OF THE INVENTION

The invention pertains to vertical takeoff and landing (VTOL) aircraft and more specifically, to methods of enhancing dynamic and static stability, as well as lateral control.

BACKGROUND OF THE INVENTION

Dozens of different VTOL aircraft configurations have been proposed and built in the last five decades. See, for example, "An Introduction to V/Stol Airplanes"), Iowa State University Press, 1981. Virtually all of these aircraft rely on some form of thrust modulation of one or more engines at constant RPM or power settings to achieve pitch and roll control during hover flight. By way of example, helicopters vary the pitch of the rotor blade to affect increases or decreases in the lift vector, while tilting the rotor blade using cyclic controls to achieve pitch and roll. Effectively, the helicopter varies the pitch of the rotor in arc segments to obtain this type of pitch and roll thrust vectoring. Rotor speed and rotor blade pitch throughout the arc are utilized to change the applied lift. Certain jet aircraft, such as the Harrier, rely on wing-tip bypass air flow mechanisms to provide varying amounts of thrust at the wing tips. More recently, a number of tilt wing aircraft, such as the Boeing, have been the subject of experimentation incorporating combinations of pivotable wings and thrust generating devices to control changes in pitch, roll and lift.

To date, all vertical takeoff and landing aircraft have been unstable in at least the longitudinal (pitch) and lateral (roll) axes, and in the case of helicopters, also unstable in the yaw axes. As a result, VTOL aircraft are difficult to fly and complex in design. At the present time, there have been several proposals for so-called "multi-post" VTOL aircraft design. Multi-post designs receive their name from the multiple source of thrust which are utilized to provide lift and propulsion. Typically, these designs incorporate stability augmentation through the use of redundant flight control computers, which also add significantly to the complexity of the aircraft design.

SUMMARY OF THE INVENTION

The invention overcomes the inherent instability of current multi-post designs by incorporating lift generating devices wherein the thrust vectors of the device are angled to converge in a cone over the center of gravity of the vehicle. By selecting an angle of conversion of approximately five degrees, then, as long as the vehicle is not upset beyond five degrees in any axes, it will naturally tend to return to a level flight attitude. As a result, the vehicle is statically stable in a hover, with only a modest resulting loss of thrust available for vertical lift.

It is an object of this invention to provide a simple means for achieving passive static stability in the pitch and roll axes for VTOL aircraft that have three or more separate lifting devices arrayed about the vehicle's center of gravity.

Specifically, the vehicle is constructed to insure that the axis of thrust of the vehicle's lifting devices is inclined, during hover flight, so that the extended axis of the thrust converges to a point approximately above the center of gravity envelope of the aircraft. This convergence provides the "pendulum stability" desirable in VTOL aircraft. If the vehicle is upset from the horizontal attitude in pitch or roll an amount less than the inclination of the propulsion units in their respective axis, then the aircraft will reassume a horizontal attitude without pilot or external influence.

To achieve the required inclination of the propulsion units, the lifting devices are mounted in such a fashion that, in the cruise/high speed configuration, the axes of rotation of the thrust units are swept an amount aft of the Y axis approximately equal to the cant of the propulsion units as defined above. Further, in a cruise/high-speed configuration, the axis of thrust of the propulsion units is parallel to the X axis of the aircraft.

BRIEF DESCRIPTION OF THE DRAWINGS

FIG. 1 is a side view of the VTOL aircraft as shown in the hover configuration.

FIG. 2 is a front view of the VTOL aircraft shown in the hover configuration.

DETAILED DESCRIPTION OF THE PREFERRED EMBODIMENT

Figure 3:
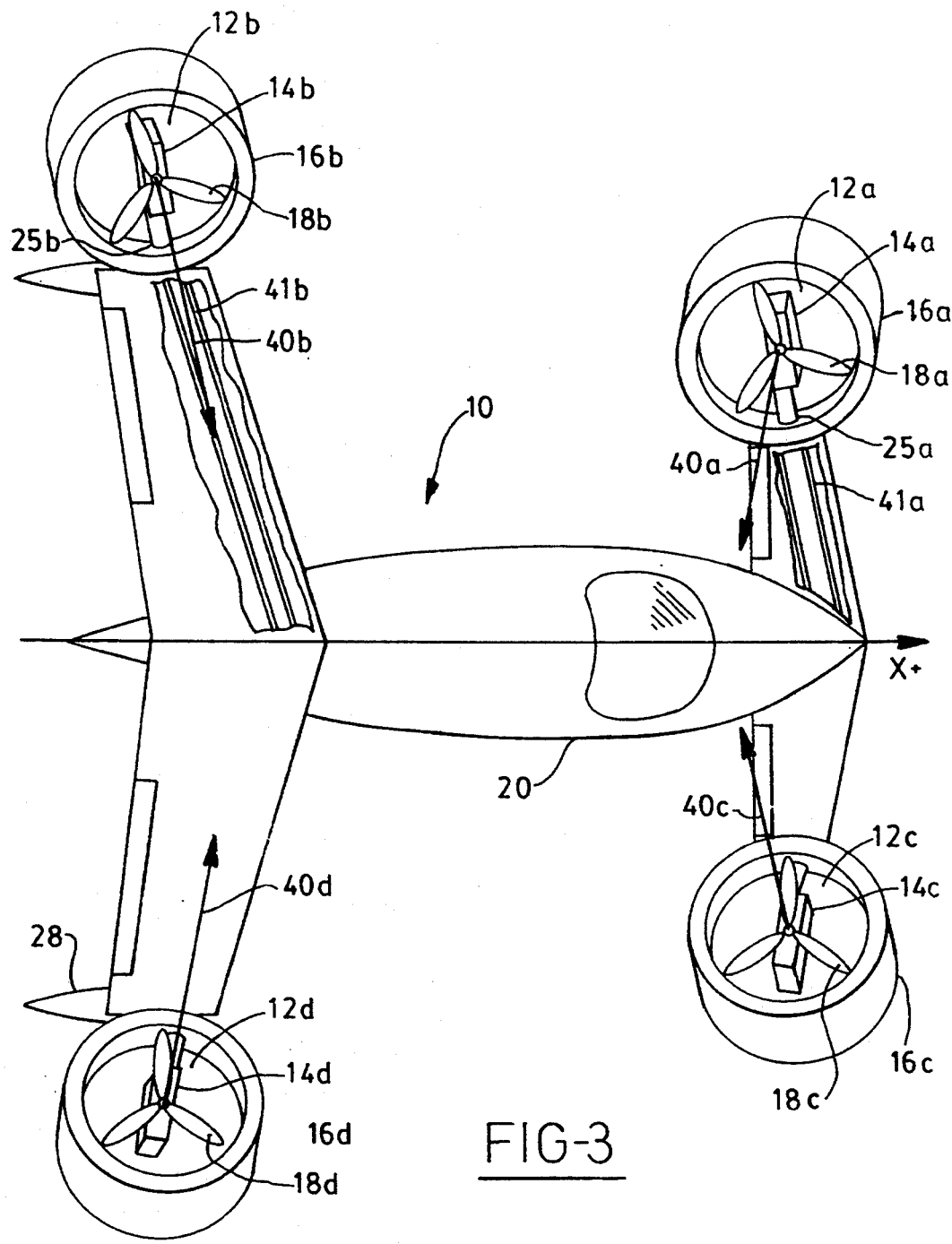
FIG. 3 is a top view of the VTOL aircraft shown in the hover configuration.

Referring to FIGS. 1 through 6, shown is a VTOL aircraft 10, preferably of a tilting duct power plant configuration.

The important elements of the invention include a plurality of thrust generating devices 12a, b, c and d, provided with power plants 14a, b, c and d, mounted within ducts 16a, b, c and d, and driving fans or propellers 18a, b, c and d. The thrust devices 12 are accordingly in the form of ducted fan thrust generating devices, selected because of their favorable power to weight ratio, and their ability to generate highly directional thrust.

Thrust devices 12 are affixed to opposite ends of canard wing 24 and main wing 26 by virtue of rotating spars 25 respectively. Rotating spars 25 are contained within the fixed wing spars 41. The fixed wing spars are contained within the canard wings 24 and main wing 26, which are in turn attached to the fuselage 20, suitable for carrying occupants 22. The aircraft is provided with conventional vertical stabilizers 28 to provide lateral stability, elevators 30 on canard wing 24 to control operation of the aircraft in pitch, as well as ailerons 32 to control operation of the aircraft in roll. Conventional forward landing gear 34 and aft landing gear 36 are provided, which may be in either fixed or retractable configuration.

Figure 4:
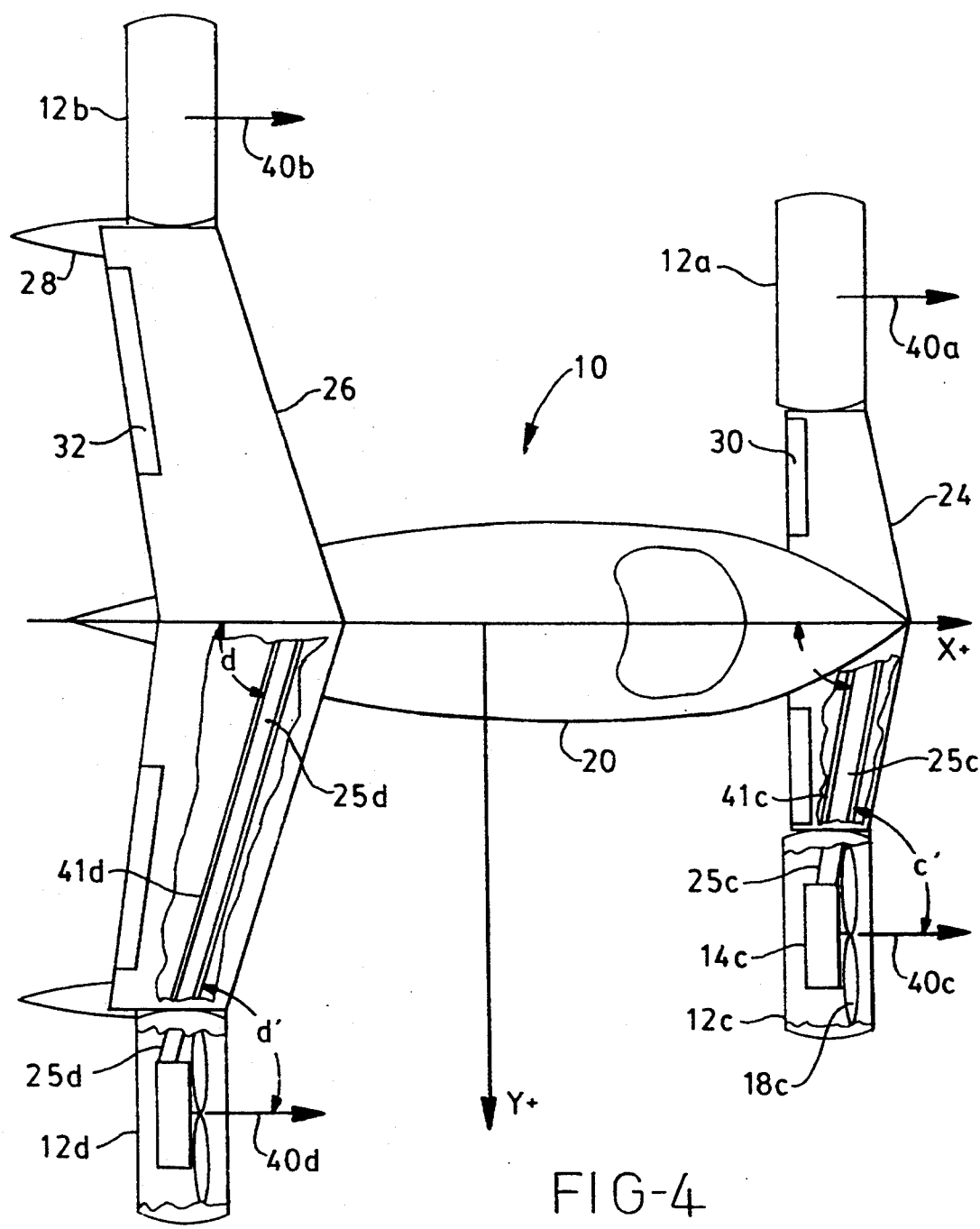
FIG. 4 is a top view of the VTOL aircraft shown in the cruise/high-speed configuration.
Figure 5:
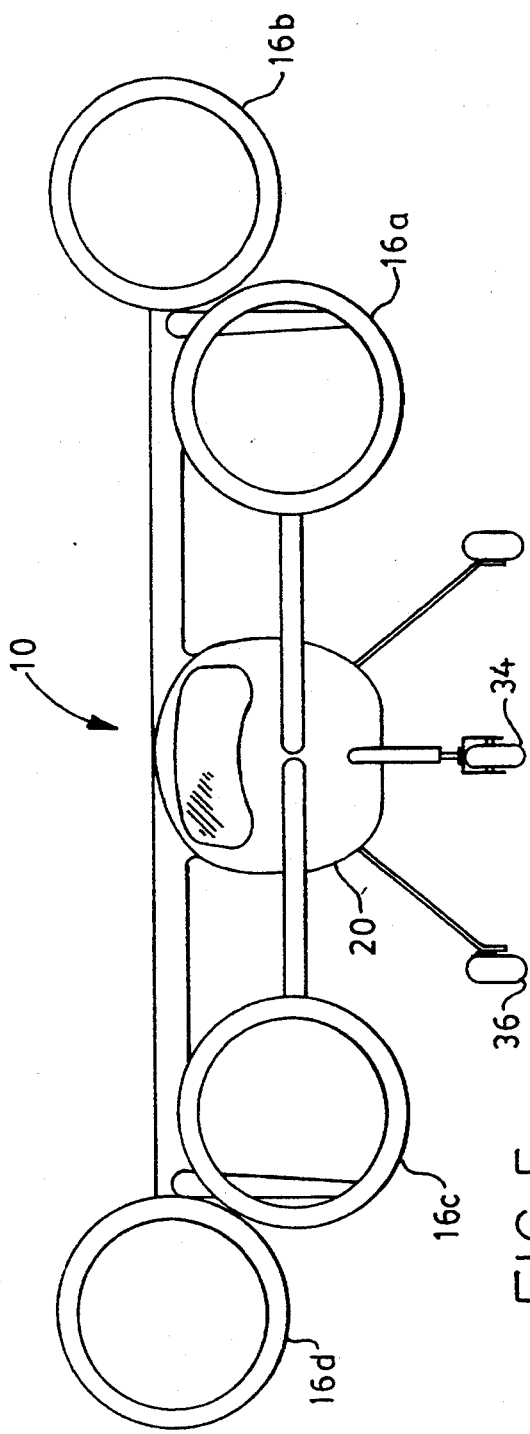
FIG. 5 is a frontal view of the VTOL aircraft shown in the cruise/high-speed configuration.
Figure 6:
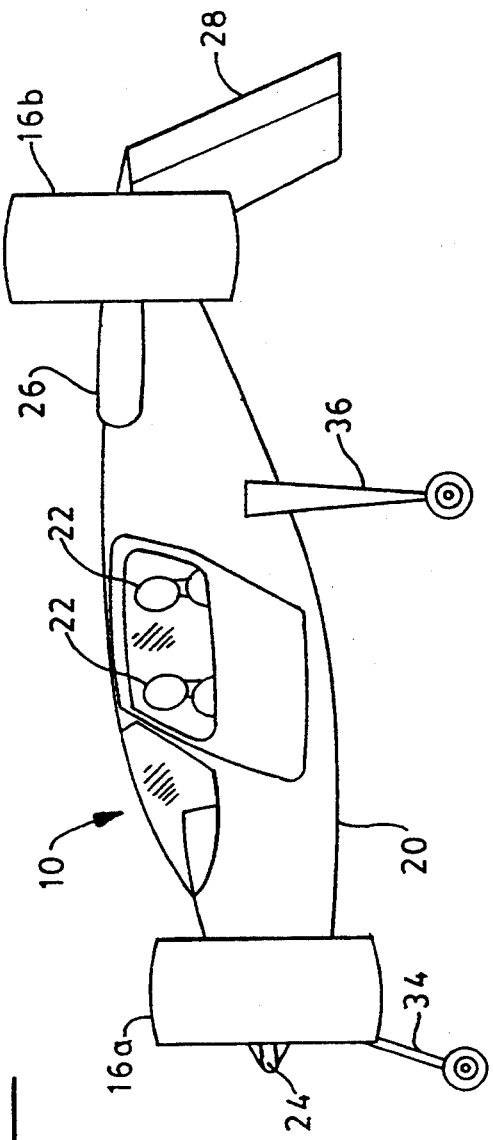
FIG. 6 is a side view of the VTOL aircraft shown in the cruise/high-speed configuration.

FIGS. 1, 2 and 3 all depict the VTOL aircraft 10 in a hover configuration, whereas FIGS. 4, 5 and 6 all depict the VTOL aircraft in cruise configuration.

In the hover configuration, thrust devices 12 are positioned to generate thrust vectors in a generally vertical direction, whereas in the cruise configuration as shown in FIGS. 4 through 6, thrust devices 12 are positioned so as to provide a generally forward thrust. It can be seen from these two basic configurations that the aircraft is adapted to be operated in a VTOL mode in FIGS. 1 through 3, by virtue of the generally upward directed thrust of the thrust devices 12. In FIGS. 4 through 6, the thrust devices 12 act in the fashion of conventional aircraft propellers, designed to propel the aircraft 10 through the air, whereby the main wing 26 and canard wing 24 generate appropriate lift, and vertical stabilizers 28 provide appropriate lateral stability. Referring now to FIGS. 1 through 3, the aircraft 10 is shown in the hover mode, with the thrust devices mounted so that each thrust device 12 extended axis of thrust 40 is directed toward the aircraft centerline so that all thrust device axes of lift converge at a point approximately over the forward and aft and left and right centers of gravity of the aircraft. While absolute convergence to a point is not a necessary, closer conversions will result in greater propulsion lift efficiency and improved stability.

Figure 7A:
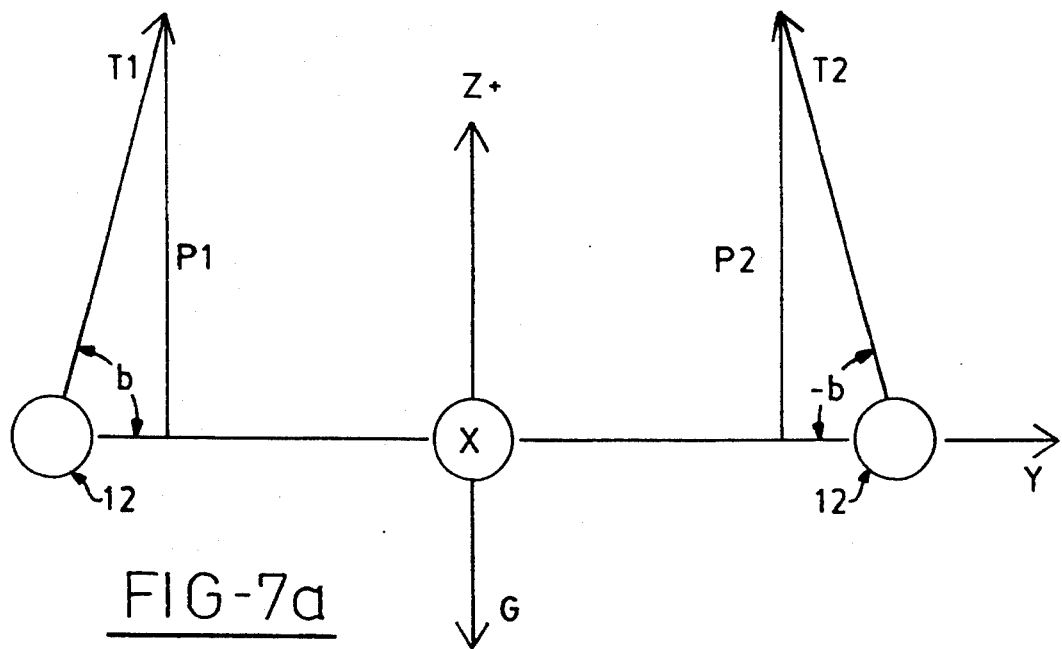
FIG. 7A is a diagrammatic view of the configuration of the thrust vectors of the aircraft in relation to the aircraft X, Y and Z axis.
Figure 7B:
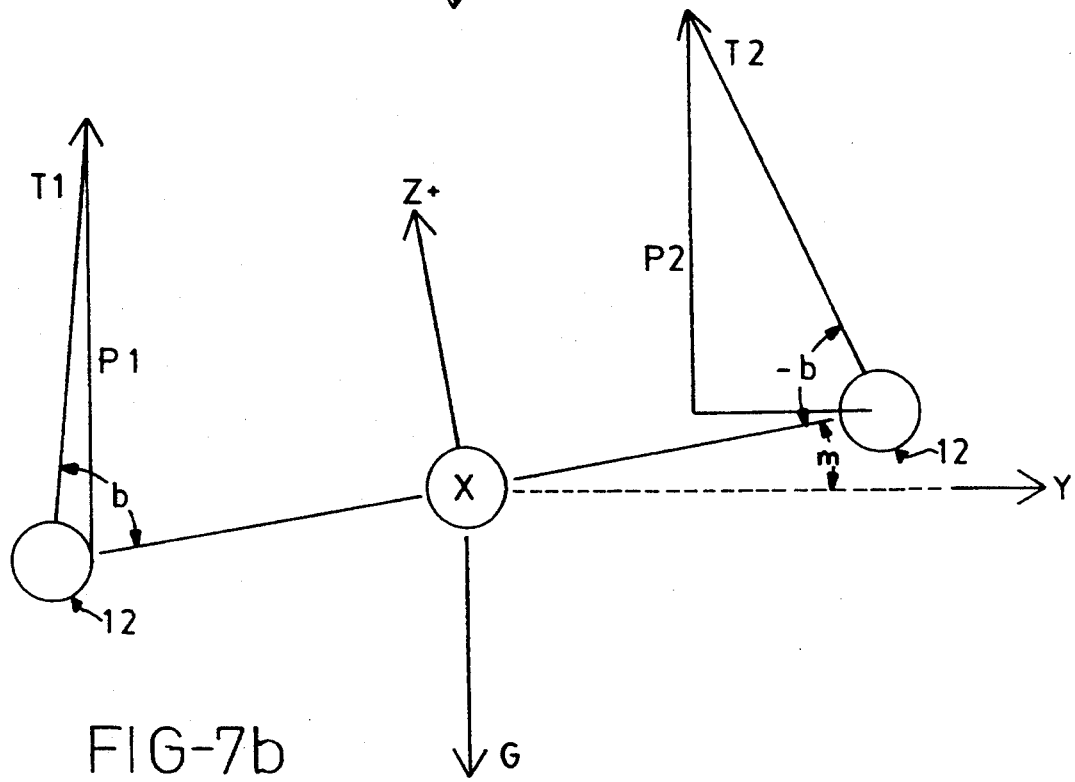
FIG. 7B is a diagrammatic representation of the thrust vectors, when the aircraft is acting in response to an included roll condition.

The static stability of the aircraft in the hover may be better understood by reference to FIGS. 7A and 7B. In FIGS. 7a and b, the fore and aft axis of the aircraft (the x axis) is orthogonal to the page (and is depicted by the X and circle at the center of each diagram. The aircraft is said to maneuver in roll about the X axis.

The second axis of aircraft rotation is the Y axis, which corresponds to a line essentially parallel to the spar of the wing and canard of the aircraft. The aircraft is said to operate in pitch about the Y axis. The Z axis as shown in diagram 7A and B is referred to as the yaw axis, being that axis about which the noise and tail of the aircraft rotate horizontally in response to aircraft yaw input.

In the hover configuration, FIG. 7a assumes operation of the aircraft in an essentially horizontal attitude. In this attitude, the X axis and Y axis of the aircraft vehicle are both parallel to the ground, and the Z axis is essentially perpendicular to the ground. Thrust vectors T1 and T2 are shown as originating from thrust devices 12 at angles "b" and "minus b" respectively. The gravity vector, g, is shown originating from the aircraft center of gravity on the Z axis. In FIG. 7A, the projection of T1 and T2 parallel to g (P1 and P2) are of equal magnitude, therefore, there are no unbalanced forces or moments on the aircraft.

Referring now to FIG. 7b, the aircraft is shown with a bank angle "m", such that the magnitude of "m" is less than the magnitude of "b". In this configuration, the magnitude of vector P1 parallel to g is now significantly greater than that of vector P2, thereby creating a restoring moment on the aircraft. As long as the magnitude of the upset angle "m" is less than the inclination of angle "b", then a restoring moment will exist, and the aircraft will return to a horizontal attitude without any external inputs. This describes a condition of static stability for the Y-Z plane (roll axis).

The bank angles which exist in the pitch axis are identical to that described above. Accordingly, a condition of aircraft static stability in pitch is achieved in the same fashion as that achieved in the roll axis.

In the preferred embodiment, the thrust devices 12 are mounted to the ends of canard 24 and main wing 26 by virtue of rotating spar elements. Canard rotating spars 25 are mounted to canard wing 24, and main wing 26. Thrust devices 12 are affixed to the ends of the rotating spars in such a fashion as to permit selective rotation of thrust devices between a first vertical thrusting position as shown in FIGS. 1 through 3, and a second horizontal thrusting position as shown in FIGS. 4 through 6.

In operation, the pilot of the aircraft applies the necessary control inputs to rotating spars 25 to cause the rotating spars to position thrust devices in an essentially vertical configuration as shown in FIGS. 1 through 3. Power plants 14 are then operated to rotate fans 18 within ducts 16 to generate lift in the conventional fashion. Equal application of power to each engine will result in creation of the necessary vertical thrust to cause the aircraft to become airborne. The aircraft can remain airborne in this hovering configuration without the requirement for any pilot input to stabilize the aircraft, so long as external forces acting on the aircraft do not create angles of pitch or bank which exceed the angles of inclination of thrust devices 12 as shown in FIGS. 7a and b.

A fuller understanding of the technique for transition from forward to vertical flight will be best understood by reference to FIGS. 4 and 2. Rotating spar elements 25 are essentially tubular. Both spars are pivotably mounted within the main wing and canard, respectively, and the spars are fixed in relation to the wing so as to restrict movement of the spars toward or away from the aircraft's centerline. In addition, both spars are fixed in a rearward swept relationship to the fore and aft centerline of the aircraft 10. As can be seen from the figures, the center lines of the spars are, in the preferred embodiment, essentially parallel to the leading edges of the canard and main wing, respectively.

As shown in FIG. 4, the axis of spar 25c is fixed in relation to the fore and aft. centerline of the aircraft 10 at an angle c, being some angle less than 90°. Likewise, the axis of spar 25d is fixed in a like relationship to the fore and aft centerline of the aircraft at angle d, being some angle less than 90°.

Thrust devices 12 are mounted to the ends of rotating spars 25 at a fixed angular relationship to the axis of said spar, shown by corresponding angle c' and d'. Angle c' is selected to be equal to angle c, and angle d' is selected to be approximately equal to angle d. In this fashion, rotation of spars 25 to the forward thrust generating position orients the thrust vectors 40 from thrust devices 12 to a position which is parallel to the fore and aft centerline of the aircraft 10.

Upon selective rotation of spars 25 from the forward thrust generating position shown in FIG. 4 to the near-vertical thrust generating position shown in FIG. 1, FIG. 2, and FIG. 3, the orientation of the axes of vertical thrust are toward the center of gravity of the vehicle. As can be seen from FIG. 4 in relation to FIG. 2, since angles c' and d' are fixed in relation to the axis of the fixed spars 41, and are angles less than 90°, an approximately 90° rotation of the rotating spars 25 results in the thrust angles of c' and d' becoming oriented substantially upward, and at the same time, inward toward the vehicle's center of gravity. As thrust devices 12 are rotated by the rotating spars 25 toward the vertical thrust generating position, angle c' and d' likewise remain fixed, and, being less than 90°, result in thrust vectors 40 directed toward the vehicle's +Z axis.

Referencing FIGS. 1, 2 and 4, in the preferred embodiment, spars 25 a and c (a not shown) are rotated slightly more than 90° from the forward thrust generating position to create a slightly rearward vertical thrust angle, designated as angles a''' (not shown) and c'' and slightly inward as shown by angles a''' and c'''. Spars 25 b and d are rotated slightly less than 90° from the forward thrust position, to create a slightly forward vertical thrust vector, as shown by angles b'' and d'' (b'' not shown) and slightly inward as shown by angles b''' and d'''.

In this fashion, thrust devices 12, by simple rotation of spars 25 a through d, create vertical thrust vectors 40, as shown in FIGS. 1 and 2, which converge toward a common point located over the vehicle's center of gravity. Because of the fixed relationship of the thrust generating devices and the axis of the fixed spars 41 to the aircraft centerline, and because of the rearward swept relationship of the spars 25 a through d in relation to the fore and aft centerline of the vehicle, simultaneous generation of the conically converging thrust vectors from thrust generating devices 12 can be achieved without the need for complicated articulating mounts for thrust generating devices 12.

To transition to horizontal flight, the pilot then selectively rotates, simultaneously, thrust devices 12 to their position as shown in FIGS. 4 through 6. Gradual rotation of thrust devices 12 results in a gradual transition of the aircraft 10 from vertical to horizontal flight. During this transition phase, the lift provided by thrust devices 12 is gradually replaced by the lift of the main wing 26 and canard 24.

I claim:

1. In an aircraft adapted for vertical takeoff and landing, including a plurality of thrust generating elements having an axis of thrust selectively pivotable between a first horizontal thrust generating position and a second vertical thrust generating position, the improvement comprising enhancing in-flight stability of said aircraft in vertical flight by further selectively pivoting the axis of thrust of at least one of said thrust generating elements toward the vehicle center of gravity when said thrust generating element is configured in said vertical thrust generating position such that said axis of thrust intersects a point directly above said vehicle.

2. In an aircraft adapted for vertical takeoff and landing, including a plurality of thrust generating elements having an axis of thrust selectively pivotable between a first horizontal thrust generating position and a second vertical thrust generating position, the improvement comprising:

further selectively pivoting the axis of thrust of at least one of said thrust generating elements toward the vehicle center of gravitvy when said thrust generating element is configured in said vertical thrust generating position;

selective pivoting of the axis of thrust of at least one of said thrust generating elements toward the vehicle center of gravity includes at least one pivotable spar fixed in a rearward swept first angular relation to the fore and aft centerline of said aircraft and adapted for rotational movement;

at least one of said thrust generating devices mounted, in second fixed angular relation to the axis of thrust of said thrust generating device, to the end of said spar opposite the fore and aft centerline of said aircraft;

said first swept angular relation of said spar to said centerline being a fixed angle less than 90;

said second fixed angular relation of said thrust generating device being an angle substantially equal to said first angle; and whereby, rotation of said spar results in orientation of the thrust axis of said thrust generating device between intersection of a point located above the vehicle center of gravity and an alignment substantially parallel with said centerline of said aircraft.

* * * * *

UNITED STATES PATENT AND TRADEMARK OFFICE
CERTIFICATE OF CORRECTION

PATENT NO. : 5,419,514
DATED : May 30, 1995
INVENTOR(S) : Duncan

It is certified that error appears in the above-indentified patent and that said Letters Patent is hereby corrected as shown below:

Title page, item [76], inventor: should be --Duncan--.

Column 5, line 3, delete "a'"" and insert --a"--;

Column 6, line 14, delete "gravitvy" and insert --gravity--.

Signed and Sealed this

Twenty-sixth Day of September, 1995

Attest:

BRUCE LEHMAN

*Attesting Officer*   *Commissioner of Patents and Trademarks*